United States Patent [19]
Eppe et al.

[11] 3,907,422
[45] Sept. 23, 1975

[54] APPARATUS FOR RECIPROCATING CARRIAGES IN COPYING MACHINES

[75] Inventors: Rudolf Eppe, Taufkirchen; Gunther Schnall, Eching; Walter Schott, Zorneding; Hermann Bronner; Rudiger Ettelbruck, both of Munich, all of Germany

[73] Assignee: Agfa-Gevaert Aktiengesellschaft, Leverkusen, Germany

[22] Filed: Nov. 28, 1973

[21] Appl. No.: 419,727

[30] Foreign Application Priority Data
Nov. 30, 1972 Germany............ 2258669

[52] U.S. Cl. .................................. 355/8; 355/25
[51] Int. Cl.² .............. G03G 15/28; G03G 15/32
[58] Field of Search ............... 355/8, 25, 81, 82, 84

[56] References Cited
UNITED STATES PATENTS

| | | | |
|---|---|---|---|
| 3,753,615 | 8/1973 | Erny et al. | 355/8 |
| 3,776,629 | 12/1973 | Ogaua | 355/8 |
| 3,809,471 | 5/1974 | Nesta et al. | 355/8 |

*Primary Examiner*—Richard M. Sheer
*Attorney, Agent, or Firm*—Michael S. Striker

[57] ABSTRACT

A copying machine wherein a reciprocable carriage supports one or more light sources and is movable forwardly and backwards with respect to a stationary original. The carriage is coupled to an endless band by a link or fork, and the band is trained over two rollers one of which can be driven by a belt and a magnetic clutch to move the carriage forwardly and the other of which can be driven by a discrete motor to move the carriage back to a starting position. Alternatively, one of the rollers can be driven forwardly at a lower speed by a transmission which can also drive the one roller rearwardly but at a higher speed. The connection between the link or fork and the band is such that the carriage is gradually accelerated during movement from either of two end positions, gradually decelerated during movement to either of the two end positions, and comes to a full stop in each of the two end positions even if the band is driven at a constant speed. The band must be driven in two directions if it is coupled to the carriage by a link, but it may be driven in a single direction if it is coupled to the carriage by a fork which is rigid with the carriage and has a slot for a pin of the band. At least one elongated portion of the band is parallel to the path of movement of the carriage.

8 Claims, 4 Drawing Figures

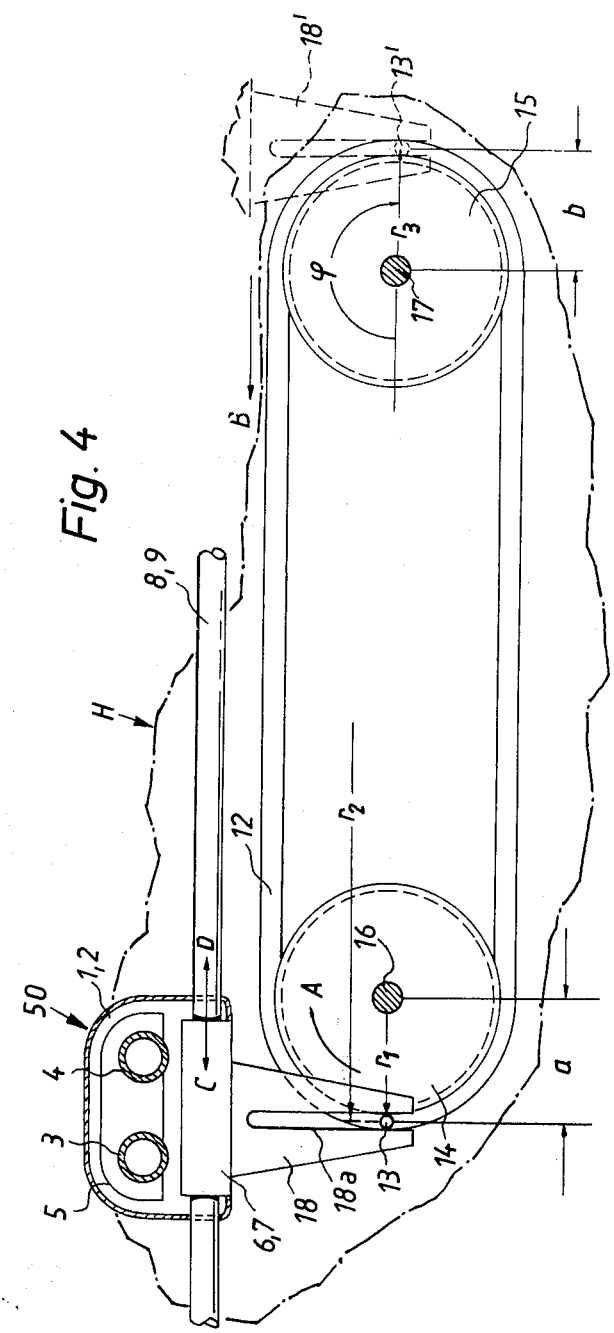

APPARATUS FOR RECIPROCATING CARRIAGES IN COPYING MACHINES

BACKGROUND OF THE INVENTION

The present invention relates to copying machines in general, and more particularly to improvements in copying machines of the type wherein the original (e.g., a book) is supported on a stationary holder and one or more components of the optical scanning means and/or illuminating means are moved back and forth with respect to the original. Still more particularly, the invention relates to improvements in apparatus for moving a reciprocable carriage or an analogous device which supports one or more component parts of the optical scanning and/or illuminating means and serves to move such part or parts with respect to an original in the course of a copying operation.

In copying machines of the just outlined character, the actual copying of an original takes place while the carriage moves in one direction, i.e., the return movement of carriage to its starting position should take up as little time as possible because such time constitutes an interval of idleness of the machine. On the other hand, the nature of parts which are mounted on the carriage is such that the carriage cannot be accelerated or decelerated at will. For example, certain part or parts on the carriage are likely to be shifted in response to excessive changes in speed of the carriage, and the mass of certain parts on the carriage is such that rapid acceleration of the carriage during the initial stage of movement toward starting position or rapid deceleration of carriage during the last stage of movement to such starting position would consume too much energy and/or would cause excessive wear on the parts which guide and move the carriage. Still further, when it reaches the one or the other end of its path, the carriage should not strike against stationary stops or the like with a substantial force. Moreover, the movements of the carriage should generate little noise, negligible amounts of heat, and should not cause excessive vibrations of the copying machine. It was found that relatively strong springs which are used to return the carriage of a conventional copying machine to its starting position are incapable of satisfying the above outlined requirements, even if the copying machine is equipped with shock absorbers which effect a relatively gradual deceleration of the carriage during the last stage of movement toward the starting position. The useful life of springs is relatively short and their manufacturing cost is very high, especially if their characteristics are predictable and reproducible during each stage of return movement of the carriage. The action of springs further depends on the surrounding temperature, on the manufacturing tolerances of the parts which are moved by the springs, and on the nature of lubrication of the surfaces between the carriage and its guide means.

SUMMARY OF THE INVENTION

An object of the invention is to provide in a copying machine an apparatus which includes a reciprocable carriage or an analogous reciprocable device and means for moving the carriage back and forth between accurately determined end positions without resorting to mechanical stops, springs and/or shock absorbers.

Another object of the invention is to provide an apparatus wherein the carriage is movable back and forth and is automatically accelerated after leaving an end position and automatically decelerated while approaching an end position even if the prime mover or movers for the carriage move at a constant speed at all times while the carriage is in motion.

A further object of the invention is to provide the apparatus with novel means for transmitting motion to the carriage and with novel means for driving the motion transmitting means.

An additional object of the invention is to provide an apparatus wherein the acceleration, deceleration and/or average speed of the carriage is not dependent on changes in temperature, manufacturing tolerances, nature of lubrication and/or other factors which influence the movements of carriages in conventional apparatus.

Still another object of the invention is to provide an apparatus whose useful life is longer than that of heretofore known apparatus and whose characteristics can be readily determined in advance to insure that the carriage is accelerated, decelerated and transported at an optimum rate to avoid damage to and/or shifting of parts which are mounted on the carriage.

A feature of the invention resides in the provision of a copying machine, especially a book copying machine wherein at least one component of illuminating and optical scanning means (e.g., one or more light sources and reflector means therefor) is reciprocable with respect to an original which is supported by a stationary holder or the like. The invention is embodied in a combination which includes a device, e.g., a carriage, which is reciprocable along an elongated path between a starting position and an end position, at least one elongated flexible element (preferably an endless band, belt, cord, wire or the like) having an elongated portion which is at least substantially parallel to the path for the device, a link, a fork or analogous means for coupling the device to the flexible element, and means for moving the flexible element at least at one substantially constant speed.

The means for moving the flexible element preferably comprises a plurality of rollers, sheaves, gears or analogous rotary members over which the flexible element is trained, and means for driving at least one of the rotary members to thereby move the flexible element. The aforementioned means for coupling can be articulately or rigidly connected with the device and is preferably articulately connected to the flexible element, e.g., by resorting to a pin, stud, post or an analogous projection which is secured to and moves with the flexible element. The orientation of the means for coupling is preferably such that the device comes to a halt while the point of connection between the flexible element and the means for coupling travels along at least one of the rotary members. If the means for coupling includes a link which is articulately connected to the flexible element as well as to the device, the device comes to a halt when the point where the link is connected to the flexible element is in line with the axis of the one rotary member and with the point of connection of the link to the device. If the means for coupling comprises a fork which is rigid with the device and has an elongated slot which receives the projection of the flexible element, the device comes to a halt when the line connecting the projection with the axis of the one rotary member is parallel to the path for the device.

The flexible element may be driven forwardly by a first prime mover and rearwardly by a discrete second”

prime mover. Alternatively, the means for moving the flexible element may include a transmission which drives the flexible element forwardly at a first (preferably low) speed and rearwardly at a second (preferably high) speed.

The novel features which are considered as characteristic of the invention are set forth in particular in the appended claims. The improved apparatus itself, however, both as to its construction and its mode of operation, together wih additional features and advantages thereof, will be best understood upon perusal of the following detailed description of certain specific embodiments with reference to the accompanying drawing.

BRIEF DESCRIPTION OF THE DRAWING

FIG. 4 is a fragmentary partly elevational and partly sectional view of a second apparatus wherein the link of FIG. 1 is replaced by a bifurcated coupling member which is rigid with the carriage.

DESCRIPTION OF THE PREFERRED EMBODIMENTS

Figure 1:
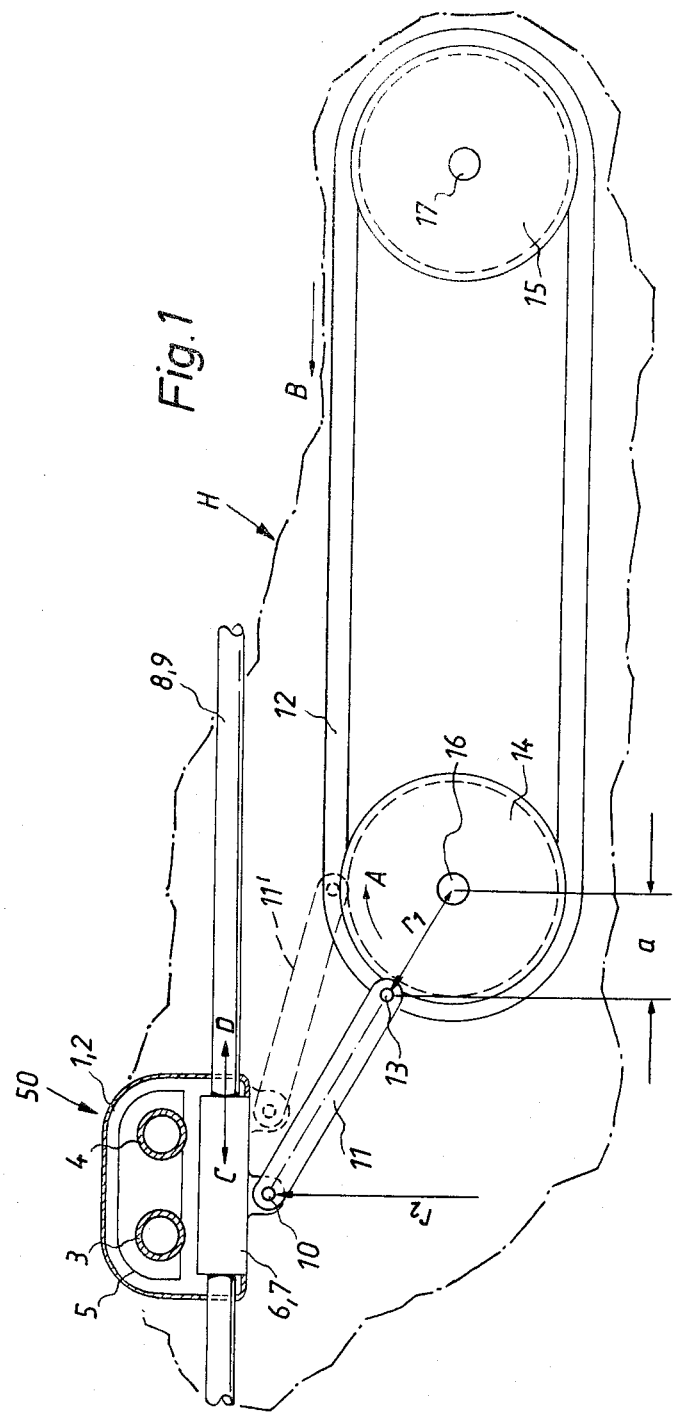
FIG. 1 is a fragmentary partly elevational and partly sectional view of an apparatus which embodies one form of the invention and wherein a carriage is coupled to the flexible element by an articulately mounted link.

Referring first to FIG. 1, there is shown a portion of a copying machine including elongated horizontal tie rods or guides 8, 9 for sleeves 6, 7 which are respectively connected with the end platens 1, 2 of a reciprocable carriage 50. The latter supports two elongated tubular light sources 3, 4 which are movable therewith back and forth in directions indicated by arrows C and D. A reflector 5 is positioned behind the light sources 3, 4 to direct the light in a predetermined direction while the carriage 50 moves with respect to an original (not shown) which rests on a stationary holder or support.

The means for reciprocating the sleeves 6, 7 along the tie rods 8, 9 comprises two coupling members or links 11 (only one shown) each of which is articulately connected to the respective sleeve by a horizontal projection or pin 10 and each of which is further articulately connected with an endless flexible element 12 by a second horizontal projection or pin 13. The flexible elements 12 (hereinafter called bands) are trained over two spaced-apart rotary members 14, 15 in the form of rollers which are respectively mounted on shafts 16 and 17. The shafts 16, 17 are journalled in the frame or housing H of the copying machine. The housing H further supports the ends of the tie rods 8 and 9.

When the link 11 which is shown in FIG. 1 assumes the solid-line position, its axis is located in a plane which includes the axis of the shaft 16 and the axis of the pin 10. Thus, the axis of the link 11 is aligned with a radius $r_1$ of the roller 14. The carriage 50 is then held in the left-hand end position or starting position, i.e., in a position which it assumes upon completion of a return movement of the band 12 in the direction indicated by an arrow B or prior to start of a forward movement in the direction indicated by an arrow A. It will be noted that the upper elongated portion or stretch of the band 12 is parallel to the tie rods 8 and 9, i.e., to the path of movement of the carriage 50.

The reference character $r_2$ denotes the radius of curvature of the path along which the pin 10 travels when it moves in response to lengthwise movement of the band 12. Since the pin 10 moves along a straight path, the center of curvature of such path is located in the infinity. If the link 11 is assumed to constitute one element of a parallel motion mechanism another link of which is the radius $r_1$ and a further link of which is the radius $r_2$, that position of such mechanism which is shown in FIG. 1 represents a position in which the pin 10 comes to rest subsequent to gradual deceleration from a maximum speed or in which the pin 10 rests prior to gradual acceleration to a maximum speed. Otherwise stated, and assuming that the rollers 14, 15 are driven at a constant speed in a counterclockwise direction, as viewed in FIG. 1, in order to move the link 11 toward the solid-line position of FIG. 1, the carriage 50 will temporarily come to a full stop as soon as the link 11 reaches its solid-line position irrespective of the fact that the rollers 14, 15 rotate at a constant speed.

If the direction of rotation of the rollers 14, 15 is thereupon reversed (so that these rollers rotate in directions indicated by arrow A), the carriage 50 undergoes a gradual acceleration until the link 11 reaches the broken-line position 11'; from then on, the speed of the carriage will equal the speed of the band 12 until the pin 13 reaches the twelve o'clock position with respect to the roller 15. The carriage 50 is thereupon gradually decelerated and its speed is reduced to zero when the pin 13 reaches the three o'clock position with respect to the roller 15.

The distance $a$ indicates in FIG. 1 that portion of the path of movement of the pin 13 in which the carriage 50 undergoes gradual acceleration while the rollers 14, 15 rotate in a clockwise direction or gradual deceleration to zero speed while the rollers 14, 15 rotate in a counterclockwise direction. It is assumed that the rollers 14, 15 are driven at a constant speed. The acceleration is greatest when the rollers 14, 15 begin to rotate clockwise in order to move the pin 13 from the solid-line position of FIG. 1. Such maximum acceleration can be selected in advance by appropriate selection of the radius $r_1$ and by appropriate selection of the speed of the rollers 14, 15. The same applies for deceleration of the carriage 50 at the right-hand end of its path and for acceleration of the carriage when the carriage dwells in the right-hand end position and the rollers 14, 15 cause the band 12 to move in the direction indicated by arrow B.

Figure 2:
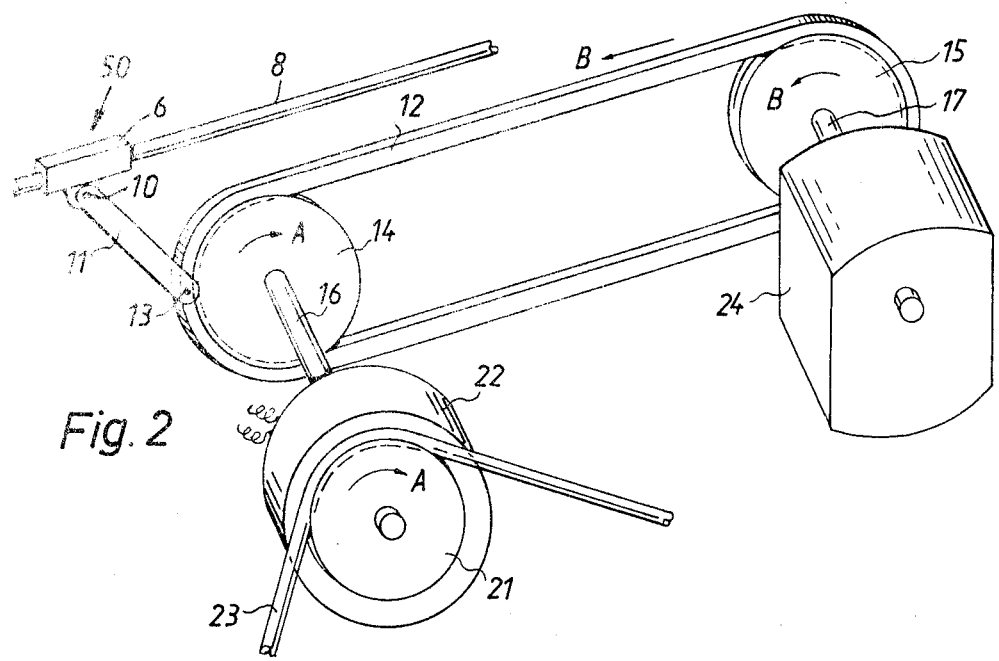
FIG. 2 is a perspective view showing a first mechanism for moving the flexible element of FIG. 1.

FIG. 2 illustrates a first mechanism for driving the rollers 14, 15 and the band 12 in directions indicated by arrows A and B. The shaft 16 supports a pulley 21 which is rotatable thereon and is driven clockwise (arrow A) at a constant speed by a belt, cord, band or an analogous flexible element 23. An electromagnetic clutch 22 on the shaft 16 is energizable to couple the pulley 21 with the shaft 16 so that the latter then drives the wheel 14 clockwise and the upper stretch of the band 12 moves in a direction to the right, as viewed in FIG. 2. The belt 23 is driven by the main prime mover of the copying machine. The parts 21–23 can be said to constitute a first prime mover which can drive the roller 14.

The shaft 17 for the roller 15 can be driven by a discrete second prime mover here shown as a motor 24 so as to rotate in the direction indicated by arrow B whereby the upper stretch of the band 12 moves in a direction to the left, as viewed in FIG. 2. When the motor 24 is off and the clutch 22 is engaged, the carriage 50 is moved forwardly (arrow D in FIG. 1). The clutch 22 is disengaged when the carriage 50 reaches the end of its forward movement, and the motor 24 is then started to move the carriage 50 back to the starting position of FIG. 1 (arrow C).

Figure 3:
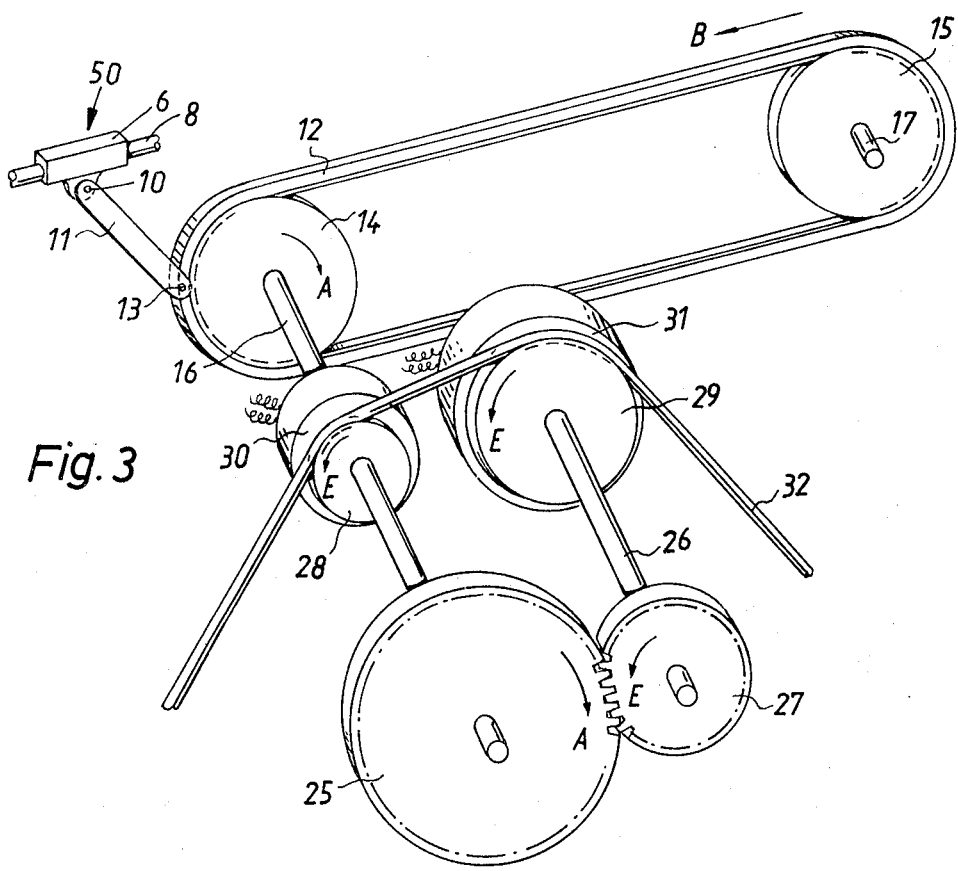
FIG. 3 is a similar perspective view showing a second mechanism for moving the flexible element of FIG. 1.

FIG. 3 illustrates a modified mechanism for moving the belt 12 for the carriage 50 back and forth so that the carriage moves along the tie rods 8 and 9 (only the tie rod 8 is actually shown). The shaft 16 for the roller 14 carries a large spur gear 25 meshing with a smaller gear 27 on an intermediate shaft 26 which is parallel to the shaft 16. A small pulley 28 on the shaft 16 is driven at a constant speed by a belt 32 which receives motion from the main prime mover of the copying machine and is further trained over a larger pulley 29 which is rotatable on the intermediate shaft 26. The pulley 28 can be coupled to the shaft 16 by an electomagnetic clutch 30, and the pulley 29 can be coupled to the intermediate shaft 26 by an electromagnetic clutch 31. The belt 32 is driven to rotate the pulleys 28, 29 in directions indicated by arrows E.

If the roller 14 is to be rotated in the direction indicated by arrow A (to move the carriage 50 forwardly), the clutch 31 is engaged (while the clutch 30 remains disengaged) so that the pulley 29 is coupled to the intermediate shaft 26 which rotates the gear 27 in the direction indicated by arrow E whereby the gear 27 drives the gear 25 which rotates in the direction indicated by arrow A and drives the roller 14 in the same direction. Since the diameter of the gear 27 is smaller than that of the pulley 29, and since the diameter of the gear 25 is much larger than that the gear 27, the carriage 50 moves forwardly at a relatively low speed.

If the operator engages the clutch 30 (while the clutch 31 remains deenergized), the rapidly rotating pulley 28 is coupled to the shaft 16 which rotates counterclockwise at a relatively high speed to rapidly return the carriage 50 to its starting position. Thus, the mechanism of FIG. 3 can dispense with a discrete motor for moving the carriage back to the starting position and, in addition, this mechanism can drive the carriage slowly in one direction and at a higher speed in the opposite direction.

The mechanism of FIG. 3 constitutes a simple but reliable step-down transmission and reversing gear. The rollers 14, 15 can be omitted and the band 12 is then trained directly over the pulleys 28, 29 if the prime mover drives one of the shafts 16, 26. By appropriate selection of the diameters of rotary parts 25, 27, 28, 29, one can provide any desired practical ratio between the forward and reverse speeds of the band 12.

In FIG. 4, the links 11 are replaced by a bifurcated coupling member or fork 18 which is rigidly connected to the sleeve 6. A similar coupling member can be provided on the sleeve 7 if the copying machine comprises two bands 12. The coupling member 18 has an elongated slot 18a which is normal to the upper stretch of the band 12 and receives the projection or pin 13 on the band 12. The radius $r_2$ represents the radius of curvature of the slot 18a; if the slot 18a is straight, the center of curvature is located in the infinity. In FIG. 4, the pin 13 is located at the nine o'clock position with respect to the roller 14 so that the carriage 50 is at a standstill at the left-hand end of its path. The carriage 50 is at a standstill at the other end of its path when the pin 13 reaches the position 13', i.e., a three o'clock position with respect to the roller 15. The coupling member then assumes the position 18'. The carriage 50 undergoes gradual acceleration while the pin 13 travels from the nine to the twelve o'clock position with respect to the roller 14, and the carriage undergoes gradual deceleration to zero speed while the pin 13 travels from the twelve to the three o'clock position with respect to the roller 15. The carriage 50 is at a standstill whenever the radius ($r_1$ or $r_3$ in FIG. 4) which connects the axis of the shaft 16 or 17 with the axis of the pin 13 is parallel to the upper stretch of the band 12. The distance $a$ is covered by the pin 13 during acceleration of the carriage 50 (while the carriage travels in the direction indicated by arrow D). The situation is reversed when the carriage 50 travels in the direction of arrow C. The speed of the carriage 50 is constant while the pin 13 travels with the upper stretch of the band 12.

The absolute value of acceleration or deceleration of the carriage 50 depends again on the rotational speed of the rollers 14, 15 and on the radii $r_1$, $r_3$ of these rollers (and more particularly on the radii of curvature of the paths along which the pin 13 travels while it moves about the axes of the shafts 16, 17). The exact value of acceleration or deceleration of the carriage 50 shown in FIG. 4 can be calculated in accordance with the following equation:

$$b = -\omega^2 \cdot r \cos\phi,$$

wherein $\omega$ is the rotational speed of the rollers 14, 15, $r$ is the radius of curavature of the arcuate portion of the path for the pin 13, and $\phi$ is the angle which the pin 13 covers during movement from a position corresponding to an end position of the carriage.

The carriage 50 of FIG. 4 will move back and forth even if the band 12 is driven in a single direction, provided that the coupling element 18 is made longer so that its slot 18a can receive the pin 13 while the latter moves with the lower stretch of the band 12. The carriage 50 then moves forwardly (arrow D) while the pin 13 moves from the solid-line position to the position 13' of FIG. 4 (along the upper stretch of the band 13), and the carriage moves rearwardly (arrow C) while the pin 13 moves from the position 13' and back to the solid-line position but along the lower stretch of the band 12. All that is necessary is to replace the coupling member 18 with a longer coupling member whose slot can confine the pin 13 irrespective of whether the pin moves with the upper or lower stretch of the band 12.

An important advantage of the improved apparatus is that it need not utilize springs which are employed in conventional apparatus and that each stage of movement of the carriage between its end positions can be regulated and determined in advance with a desired degree of accuracy and reproducibility. The rate of movement of the carriage is not dependent on the manufacturing tolerances, on the nature of lubricant which is used between the parts which move relative to each other, and/or on the temperature of guide means for the carriage. The acceleration of the carriage during the initial stage of its movement to or from the starting position as well as the deceleration of carriage during the last stage of its movement to or from the starting position can be regulated in the aforedescribed manner as well as by using appropriate friction clutches or elastic intermediate elements which are interposed in the power train between the band 12 and the constant-speed prime mover means.

The coupling member 11 or 18 and its mounting in a manner as shown in FIG. 1 or 4 render it possible to drive the carriage at a high speed (especially during movement back to the starting position) while simultaneously insuring a satisfactory gradual acceleration and deceleration (combined with a desirable braking action) at each end of the path for the carriage. All this insures that the carriage can return to its starting position within a short interval of time so that it can perform forward strokes at rapidly following intervals. The structure which couples the carriage 50 with the band 12 can be said to constitute a transmission whose output member (pin 10 or the sleeve 6) comes to a full stop while the input member (pin 13) moves at a constant speed and while the input member reaches certain predetermined portions of its path. Such transmission is superior to a construction wherein the carriage is caused to strike against a stop, even if the movement of carriage is cushioned by a shock absorber or the like, because the input member of the improved transmission is subjected to less pronounced reaction forces when the output member reaches the one or the other point where it is at a standstill. The energization and deenergization of the clutch 22 and motor 24 or clutches 30, 31 can be readily timed in such a way that the carriage 50 comes to a stop at the exact moment when the link 11 reaches the position shown in FIG. 1 by solid lines (or the corresponding position with respect to the wheel 15 of FIG. 1), or when the coupling member 18 reaches one of the two positions shown in FIG. 4. Eventual movements of the rollers 14, 15 beyond the positions corresponding to the just described positions of the link 11 and coupling member 18 result in extremely small movements of the carriage 50 beyond the corresponding end positions.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Leters Patent is set forth in the appended:

1. In a copying machine, particularly in a book copying machine wherein at least one component of illuminating and optical scanning means is reciprocable with respect to a stationary original, a combination comprising a carriage which is reciprocable along an elongated path; at least one elongated endless flexible element having an elongated portion which is at least substantially parallel to said path; means for coupling said carriage to said flexible element; and means for moving said flexible element at a plurality of substantially constant speeds, comprising a plurality of rotary members over which said flexible element is trained and means for driving said flexible element through the medium of at least one of said rotary members, said driving means comprising a transmission having means for rotating said one rotary member forwardly at a first speed and rearwardly at a second speed, said means for rotating said one rotary member comprising a first shaft rigid with said one rotary member, a second shaft, mating first and second gears respectively secured to said first and second shafts, first and second pulleys respectively mounted on and rotatable relative to said first and second shafts, first and second clutch means actuatable to respectively connect said first and second pulleys to said first and second shafts, and a constant-speed belt trained over and arranged to drive said pulleys.

2. A combination as defined in claim 1 wherein said means for coupling comprises a coupling member which is articulately connected with said carriage.

3. A combination as defined in claim 1, wherein said means for coupling comprises a coupling member which is articulately connected with said flexible element.

4. A combination as defined in claim 2, wherein the orientation of said coupling member is such that said carriage comes to a halt while the point where said coupling member is connected to said flexible element travels along at least one of said rotary members.

5. A combination as defined in claim 4, wherein said flexible element comprises a projection and said coupling member is rigid with said carriage and has a slot for said projection.

6. A combination as defined in claim 1, wherein the diameter of said first gear exceeds the diameter of said second gear and the diameter of said second pulley exceeds the diameter of said first pulley.

7. A combination as defined in claim 6, wherein said one rotary member is arranged to move said flexible element forwardly while rotating at a lower speed and rearwardly while rotating at a higher speed.

8. A combination as defined in claim 1, further comprising elongated guide means for said carriage, said portion of so flexible element being parallel to said guide means.

* * * * *